US 8,706,496 B2

(12) United States Patent
Sanjaume

(10) Patent No.: US 8,706,496 B2
(45) Date of Patent: Apr. 22, 2014

(54) AUDIO SIGNAL TRANSFORMING BY UTILIZING A COMPUTATIONAL COST FUNCTION

(75) Inventor: Jordi Bonada Sanjaume, Barcelona (ES)

(73) Assignee: Universitat Pompeu Fabra, Barcelona (ES)

( * ) Notice: Subject to any disclaimer, the term of this patent is extended or adjusted under 35 U.S.C. 154(b) by 1548 days.

(21) Appl. No.: 11/900,902

(22) Filed: Sep. 13, 2007

(65) Prior Publication Data

US 2009/0076822 A1 Mar. 19, 2009

(51) Int. Cl.
G10L 13/00 (2006.01)
G06F 15/00 (2006.01)
G06F 3/16 (2006.01)

(52) U.S. Cl.
CPC ............... *H05K 999/99* (2013.01); *G06F 3/16* (2013.01)
USPC .......................................... 704/268; 704/200

(58) Field of Classification Search
CPC ............................... H05K 999/99; G06F 3/16
USPC .......................................... 704/272, 270, 268
See application file for complete search history.

(56) References Cited

U.S. PATENT DOCUMENTS

| 5,327,498 | A | | 7/1994 | Hamon |
| 5,327,521 | A | * | 7/1994 | Savic et al. ................... 704/272 |
| 5,401,897 | A | | 3/1995 | Depalle et al. |
| 5,488,956 | A | * | 2/1996 | Bartelt et al. ................. 600/459 |
| 5,536,902 | A | | 7/1996 | Serra et al. |
| 5,774,837 | A | * | 6/1998 | Yeldener et al. .............. 704/208 |
| 6,115,684 | A | * | 9/2000 | Kawahara et al. ............ 704/203 |
| 6,266,003 | B1 | | 7/2001 | Hoek |
| 6,311,158 | B1 | | 10/2001 | Laroche |
| 6,336,092 | B1 | * | 1/2002 | Gibson et al. ................. 704/268 |
| 6,549,884 | B1 | | 4/2003 | Laroche et al. |
| 6,615,174 | B1 | * | 9/2003 | Arslan et al. .................. 704/270 |
| 2007/0185715 | A1 | * | 8/2007 | Wei et al. ....................... 704/254 |

FOREIGN PATENT DOCUMENTS

| FR | 2679689 | 1/1993 |
| WO | WO9013887 | 11/1990 |
| WO | WO9303478 | 2/1993 |

OTHER PUBLICATIONS

Moulines, E., and F. Charpentier. "Pitch-synchronous waveform processing techniques for text-to-speech synthesis using diphones", Eurospeech, 1989.

Crochiere, R. E. and Rabiner, L. R., *Multirate Digital Signal Processing*, Prentice-Hall, 1983, ISBN: 9780136051626.

(Continued)

*Primary Examiner* — David R. Hudspeth
*Assistant Examiner* — Farzad Kazeminezhad
(74) *Attorney, Agent, or Firm* — Lawrence G. Fridman

(57) ABSTRACT

A sequence is received of time domain digital audio samples representing sound (e.g., a sound generated by a human voice or a musical instrument). The time domain digital audio samples are processed to derive a corresponding sequence of audio pulses in the time domain. Each of the audio pulses is associated with a characteristic frequency. Frequency domain information is derived about each of at least some of the audio pulses. The sound represented by the time domain digital audio samples is transformed by processing the audio pulses using the frequency domain information. The sound transformation utilizes overlapping windows and a computational cost function which depends on a product of the number of the pitch periods and the inverse of the minimum fundamental frequency within the window is determined.

25 Claims, 12 Drawing Sheets

(56) References Cited

OTHER PUBLICATIONS

Figure 1:
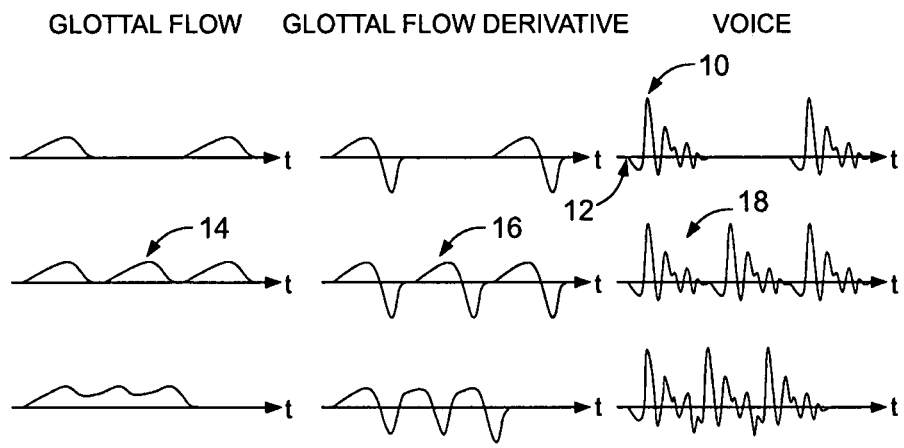

Moulines, E., and F. Charpentier. "Pitch synchronous waveform processing techniques for text-to-speech synthesis using diphones." *Speech Communication*, 9 (5/6):453-467, 1990.

P. Depalle and X. Rodet, "Synthèse additive par FTT inverse", Rapport Interne IRCAM (Institut de Recherche et Coordination Acoustique/Musique), Paris 1990.

Bonada, J. "Wide-Band Harmonic Sinusoidal Modeling." *Proc. of the 11$^{th}$ Int. Conference on Digital Audio Effects (DAFx-08)*. Espoo, Finland, Sep. 1-4, 2008.

International Search Report and The Written Opinion of the International Searching Authority or the Declaration for International Application No. PCT/EP2008/062140, dated Nov. 24, 2008.

Bonada, J. "High Quality Voice Transformations based on Modeling Radiated Voice Pulses in Frequency Domain." *Proc. of the 7th Int. Conference on Digital Audio Effects*. Naples, Italy, Oct. 5-8, 2004.

Rodet et al., "Spectral Envelopes and Inverse FFT Synthesis." *AES*. San Francisco, USA, 1992.

Laroche, J. "Frequency-Domain Techniques for High-Quality Voice Modification." *Proc. of the 6th Int. Conference on Digital Audio Effects*. London, UK, Sep. 2003.

Laroche, J. and Dolson, M., "Improved Phase-Vocoder Time-Scale Modification of Audio." *IEEE Transactions on Speech and Audio Processing*, vol. 7, No. 3, pp. 323-332, May 1999.

Levine, S. N., Verma, T. S., and Smith, J. O., "Multiresolution Sinusoidal Modeling for Wideband Audio with Modifications," *Proceedings of the International Conference on Acoustics, Speech, and Signal Processing*, Seattle 1998.

Peeters, G. "Modèles et modification du signal sonore adaptés à ses caractéristiques locales." *PhD Thesis, spécializé Acoustique Traitement du signal et Informatique Appliqués à la Musique, Universite Paris 6*, 2001.

Rodet, X., Y. Potard, and J.B.B. Barrière. "The CHANT Project: From The Synthesis of The Singing Voice To Synthesis In General." *Computer Music Journal*, 1984: 8(3):15-31.

Serra et al., "Spectral Modeling Synthesis: A Sound Analysis/Synthesis System Based On A Deterministic Plus Stochastic Decomposition," *Computer Music Journal*, vol. 14, No. 4, Winter 1990, Massachusetts Institute of Technology, 1990.

Smits, R., and B. Yegnanarayana. "Determination of Instants of Significant Excitation in Speech using Group Delay Function." *IEEE Transactions on Speech and Audio Processing*, vol. 3, No. 5, Sep. 1995.

Verma, T. S., Levine, S. N., and Meng, T., "Transient Modeling Synthesis: a flexible analysis/synthesis tool for transient signals." *Proceedings of the International Computer Music Conference*, Greece 1997.

Yegnanarayana, B., and R. Veldhuis. "Extraction of Vocal-Tract System Characteristics from Speech Signal." *IEEE Transactions on Speech and Audio Processing*, 1998: vol. 6, No. 4, pp. 313-327.

http://ccrma.stanford.edu/~jos/Interpolatin/Interpolation.pdf,,

"MUS420/EE267A Lecture 4, Interpolated Delay Lines, Ideal Bandlimited Interpolation, and Fractional Delay Filter Design", Julius O. Smith III, Feb. 10, 2007.

\* cited by examiner

AUDIO SIGNAL TRANSFORMING BY UTILIZING A COMPUTATIONAL COST FUNCTION

BACKGROUND

This description relates to audio signal transforming.

Audio signal transforming can include, for example, transformations of a monophonic voice (or musical instrument) signal to change its pitch or time scale. Such transformations can be useful in a wide variety of applications that involve audio signal processing, including telephony, voice recording and playback, sound creation and editing, to name only a few.

SUMMARY

In general, in an aspect of the concepts described below, a sequence is received of time domain digital audio samples representing sound (e.g., a sound generated by a human voice or a musical instrument). The time domain digital audio samples are processed to derive a corresponding sequence of audio pulses in the time domain. Each of the audio pulses is associated with a characteristic frequency. Frequency domain information is derived about each of at least some of the audio pulses. The sound represented by the time domain digital audio samples is transformed by processing the audio pulses using the frequency domain information.

Implementations may include one or more of the following features. Each of the audio pulses is represented as a vector of sinusoids based on the derived frequency information. Copies of the audio pulses are generated and overlapped. The characteristic frequency of each of the pulses is determined. Starting times are determined for each of at least some of the audio pulses. Determination of the starting times includes reducing a phase difference associated with the characteristic frequency and the respective lower frequency harmonics for each of at least some of the audio pulses. A windowing operation is applied to the sequence of audio pulses. The transformation is based on vector-sinusoid representations of the pulses. The transformation is based on specified transformation parameters. The specified transformation parameters include one or more of: pitch transposition parameters, time scaling parameters, excitation templates, timbre modification parameters, and volume parameters. The audio represented by the processed audio pulses is then presented. The sound comprises a monophonic harmonic sound. The sound may be read from a memory or received in real time. The transformed sound may be delivered to a memory or a sound presentation device. At least one of the processing, deriving, and transforming is performed by software, or by hardware, or by a combination of the two. The transformed sound may be used for voice synthesis, or voice broadcasting, or voice character transformation, or forming additional parts for music production, or voice enhancement, or in Internet protocol voice packets. In program implementations, the instructions may be a plug-in component for a software application, or a software library for a digital signal processor or a downloadable application.

These and other aspects and features, and combinations of them, may be expressed as methods, apparatus, business methods, systems, means for performing functions, program products, and in other ways.

Other features and advantages will become apparent from the following description and the claims.

DESCRIPTION

FIGS. 1 through 5, 10 through 12, and 14 show waveforms and curves.

FIGS. 6, 7A, 7B, 8, 9, portions of 10 through 12 and 14 show process sequences.

Figure 13A:
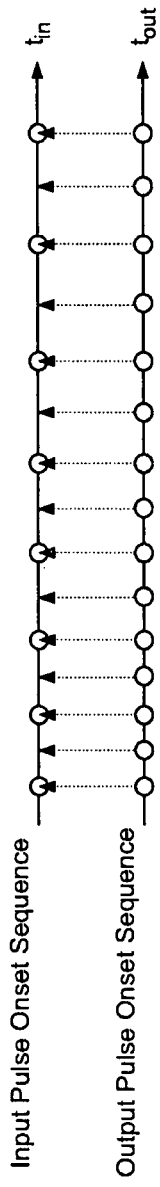
Figure 13B:
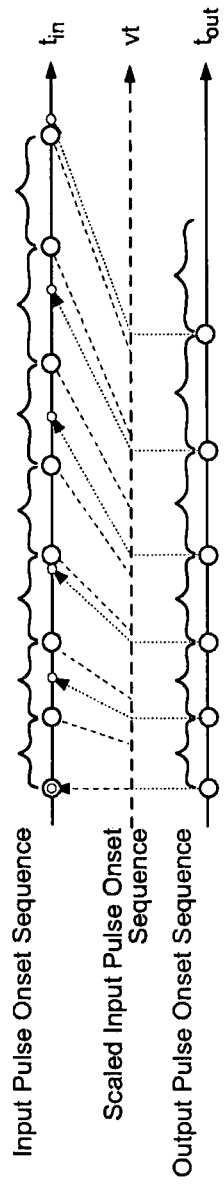
Figure 13C:
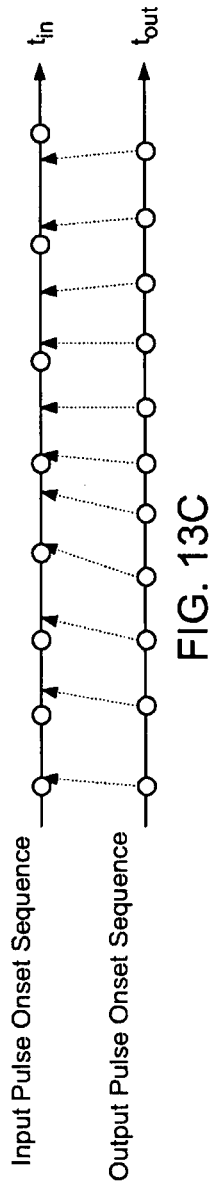

FIGS. 13A, 13B, and 13C illustrate pulse sequence relationships.

Generally in this description (but depending on the context), the following terms may be interpreted as indicated below.

A periodic signal is an audio signal that includes a shorter signal that is repeated, and can be decomposed into harmonics.

A pitch period is the shortest period of a signal for which a unit of the audio signal repeats.

A pitch rate is the number of pitch periods per second in the periodic signal.

A quasi-periodic signal is virtually periodic with respect to adjacent pitch periods, but not necessarily periodic with respect to non-adjacent or distant pitch periods.

A periodic signal has a fundamental frequency that is the inverse of the pitch period.

An harmonic of a periodic signal is a frequency component of the signal that is an integer multiple of the fundamental frequency. All harmonics are periodic at the signal frequency, and (due to the properties of Fourier series) the sum of a periodic signal and its harmonics is also periodic at the fundamental frequency. Many oscillators, including the human voice, produce signals that are quasi-periodic and can be approximated by a decomposition into harmonics.

A pulse onset is the beginning time of a pitch period. The pitch period is the duration between consecutive pulse onsets in a periodic signal. Although a pulse onset can be placed at any arbitrary position within the pitch period, for some periodic or quasi-periodic signals, such as the human voice, certain time instants are preferable for placement of a pulse onset.

In a simplified voice model, a train of glottal pulses at the pitch rate excites a resonant filter that represents the vocal tract. A speaker or singer changes the pitch of his voice by modifying the rate of the glottal pulses.

As shown in FIG. 1, the shape of the time-domain waveform signal 10 around the glottal pulse onsets 12 is roughly independent of the pitch (that is, shape invariant), and is dependent mainly on the impulse response of the vocal tract. The vocal tract filters the glottal pulses 14 (air flow, the left column of FIG. 1) and adds resonances and anti-resonances (e.g., formants and anti-formants) to shape the glottal flow derivative pulses 16 (middle column, air pressure). Although each row has a different pitch, the shapes of the waveforms around the voice pulses 118 (right column, air pressure after the vocal tract) are the same independently of pitch.

Figure 2:
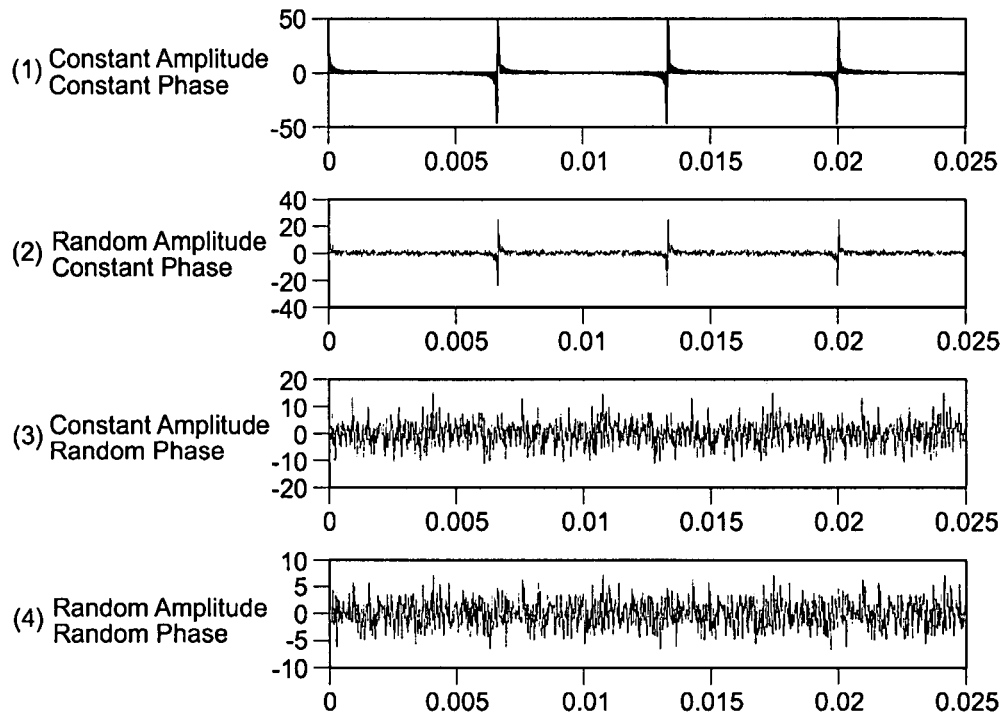

As shown in FIG. 2, the shape of the waveform around each voice pulse is related to the amplitude, frequency, and phase values of the harmonics at the voice pulse onset time. Thus, if a transformation method is one that preserves the phase relationship at estimated voice pulse onsets, then the best quality processed signal is obtained by having the estimated voice pulse onsets match the glottal pulse onsets mentioned before. In the time domain waveforms of four pulses shown in FIG. 2, the pitch rate is 150 Hz. In waveform (1) both the amplitude and phase of all harmonics are constant at all voice pulse onsets. In (2), the amplitude at the voice pulse onsets is random. In (3), the phases at the voice pulse onsets is random. And in (4), both amplitude and phase are random. As illustrated, the waveform shapes in (2), (3), and (4) are significantly affected by these differences.

Algorithms used to detect voice pulse onsets typically rely on the minimal phase characteristics of the voice source (i.e., glottal signal) (e.g., (Smits, R., and B. Yegnanarayana, "Determination of Instants of Significant Excitation in Speech using Group Delay Function", IEEE Transactions on Speech and Audio Processing, Vol. 3, No. 5, September 1995) and (Yegnanarayana, B., and R. Veldhuis, "Extraction of Vocal-Tract System Characteristics from Speech Signal", IEEE Transactions on Speech and Audio Processing, 1998: vol. 6, no. 4, pp. 313-327). Following this idea, (Bonada, J. "High Quality Voice Transformations based on Modeling Radiated Voice Pulses in Frequency Domain", Proc. of the 7th Int. Conference on Digital Audio Effects. Naples, Italy, Oct. 5-8, 2004) proposed to estimate the voice pulse onsets using the harmonic phases based on the property that when the analysis window is properly centered, the unwrapped phase envelope defined by the harmonics is nearly flat with shifts under each formant, thus being close to a maximally flat phase alignment (MFPA) condition.

A pulse onset sequence is a sequence of consecutive pulse onsets.

A pulse or voice pulse is the waveform that occupies the pitch period, i.e., the audio found between consecutive voice pulse onsets, an interpretation that differs from the one typically adopted by the speech community, in which one pulse is the result of filtering a glottal pulse through the vocal tract, and may have a duration shorter or longer than the pitch period.

Pulse phase alignment (or pulse phase envelope) is the envelope defined by the harmonic phase values at the voice pulse onset.

Figure 3:
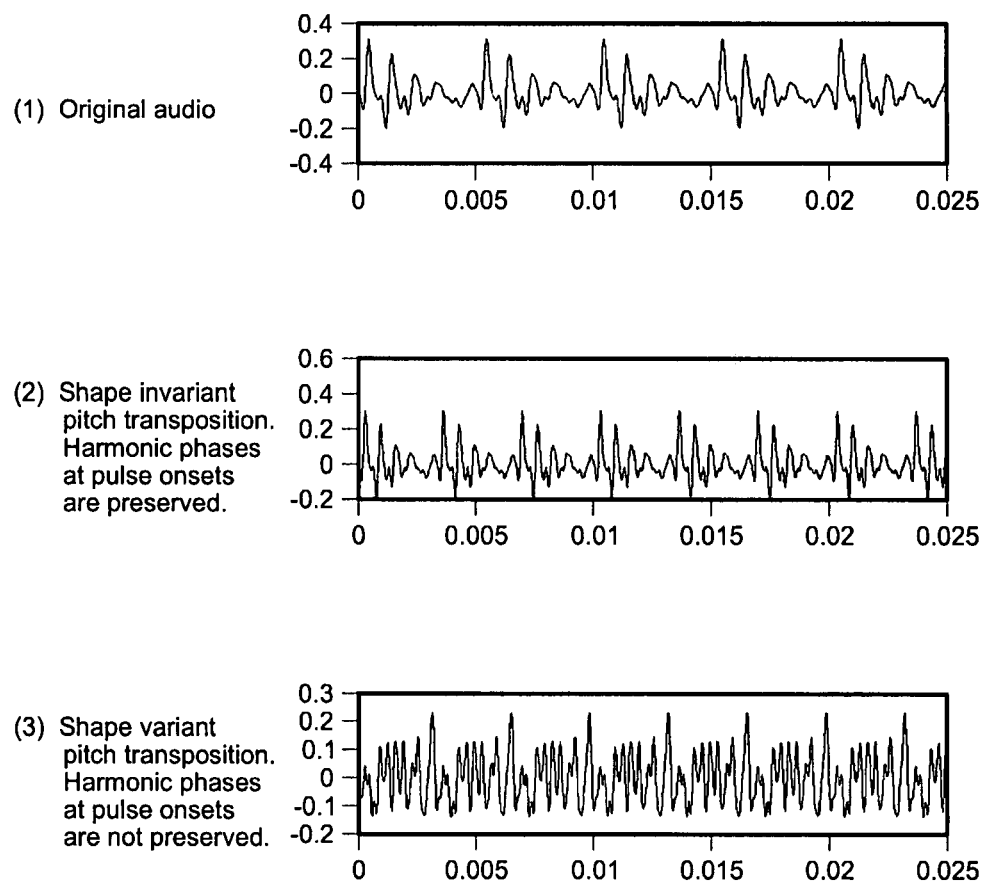

A transformation is said to be shape invariant if it preserves the pulse phase alignment, for example, by preserving the phase coherence between the various harmonics at each voice pulse onset. As shown in FIG. 3, for an original audio waveform (1), waveform (2) is shape invariant because the harmonic phases at voice pulse onsets, and the waveform shapes of the pulses, are preserved. Waveform (3) reflects a shape variant transformation because the waveform shape is radically different than in the original signal. In both waveforms (2) and (3), the transformations raise the pitch rate by a 1.5 factor.

Figure 4:
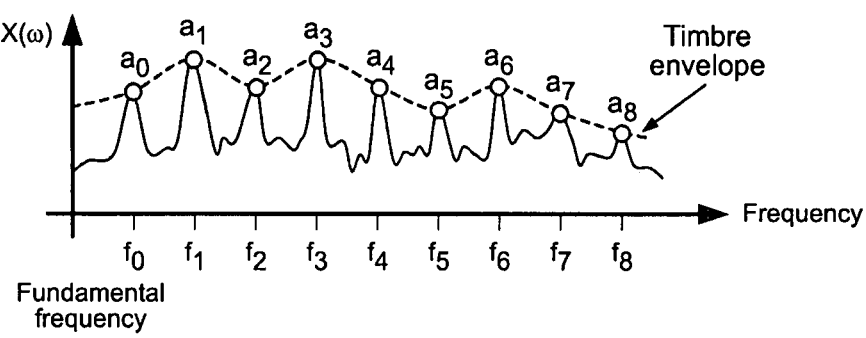

Timbre (or timbre envelope) is the amplitude envelope versus frequency defined by the harmonics of a signal (FIG. 4). Timbre is often computed by interpolating in frequency the harmonics' amplitudes (for example, using linear or spline interpolation) or by estimation of the parameters of a filter that approximates the envelope (e.g., LPC). For a signal that is not periodic or quasi-periodic, timbre is the amplitude envelope versus frequency defined by its predominant frequency components. In FIG. 4, the harmonic peaks of the amplitude spectrum (shown in solid line) are indicated by circles and the timbre envelope by a dashed line.

One way to transform an audio signal, in the time domain, is called OLA (OverLap and Add). Time domain OLA extracts windowed grains from an input audio signal and overlaps them to generate an output signal. OLA methods include SOLA, WSOLA and TD-PSOLA (Time-Domain Pitch Synchronous Overlap and Add). TD-PSOLA, proposed in (Eric Moulines and F. Charpentier, Pitch-synchronous waveform processing techniques for text-to-speech synthesis using diphones, Speech Communication, 9 (5/6):453-467, 1990), performs both time-scaling and pitch-shifting transformations and has been widely used for speech processing and synthesis.

Figure 5:
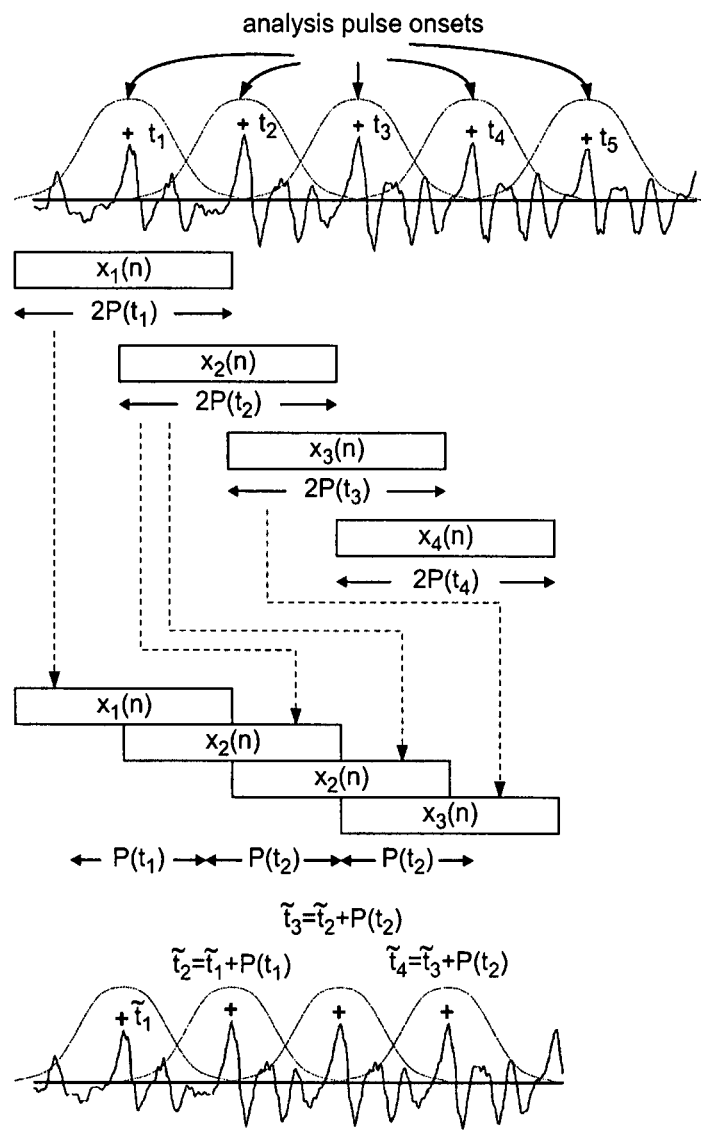

TD-PSOLA assumes that the audio signal to be transformed is characterized by a pitch (for example, a human voice or a monophonic musical instrument). The detected pitch is used to synchronize the transformed time segments to avoid pitch discontinuities. The overlapping procedure is performed pitch-synchronously to retain high quality sound modifications. As shown in FIG. 5, in the TD-PSOLA algorithm, a first stage analyzes and segments the input audio signal into grains (represented by horizontal boxes), and a second stage overlaps and adds the grains to synthesize the modified signal. TD-PSOLA is shape invariant and enables independent control of each pulse.

Figure 6:
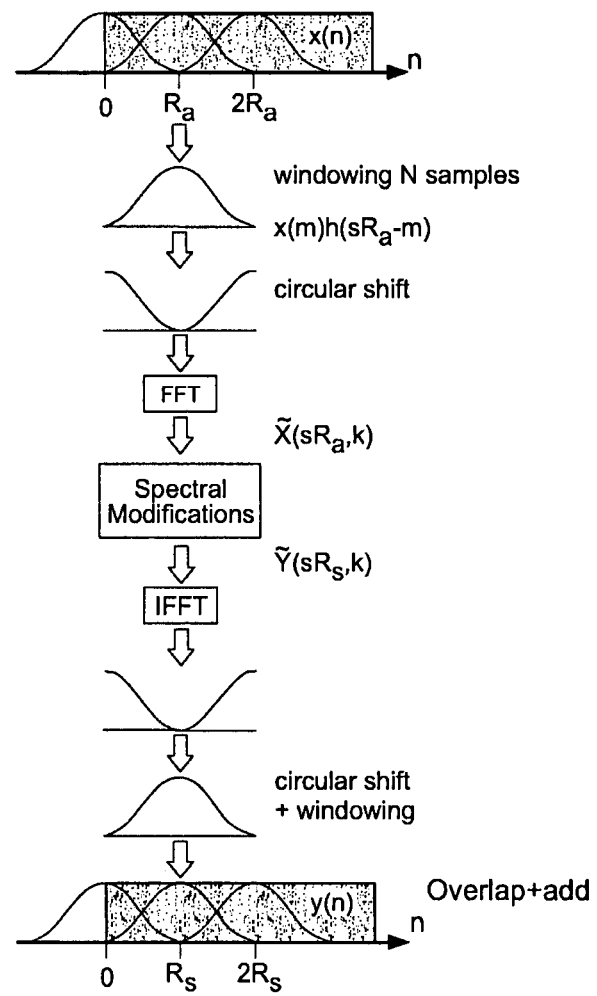
Figure 7A:
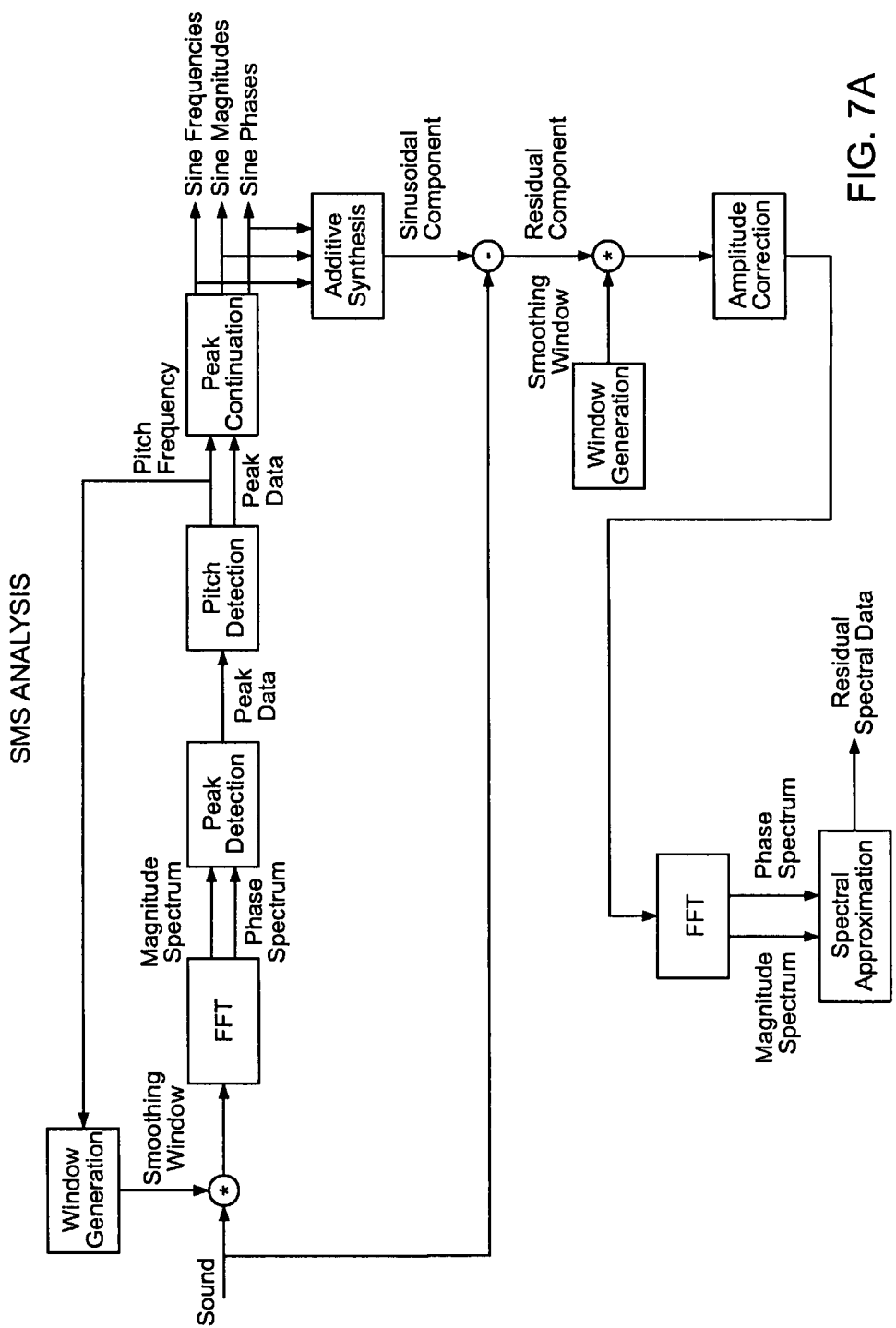
Figure 7B:
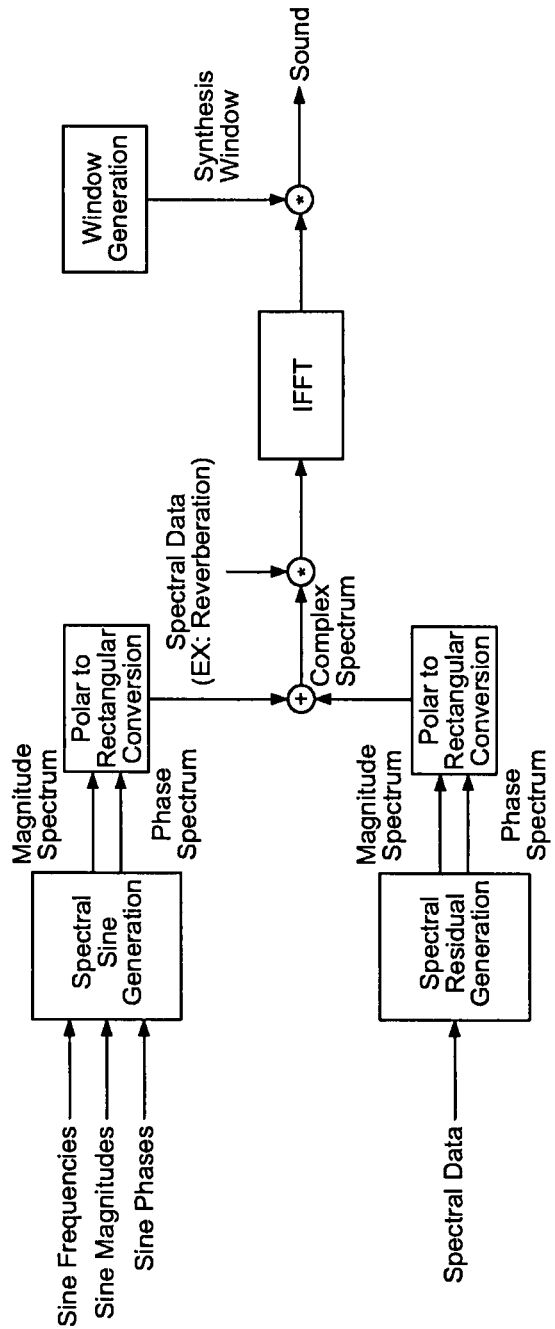
Figure 8:
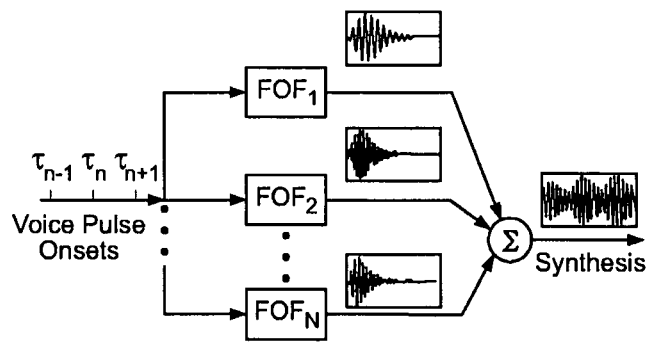

Audio signal transforming may also be performed in the frequency domain, for example by a phase vocoder based on a STFT (short-time Fourier Transform). The phase-vocoder can be understood as a filter bank or as a block-by-block process (as shown in FIG. 6). In the block-by-block view, the analysis gives $$X(sR_a, k) = \sum_{m=-\infty}^{\infty} x(m)h(sR_a - m)e^{-j\frac{2\pi mk}{N}}$$

$$= e^{-j\frac{2\pi sR_a k}{N}} \sum_{m=-\infty}^{\infty} x(m)h(sR_a - m)e^{j\frac{2\pi(sR_a - m)k}{N}}$$

$$= e^{-j\frac{2\pi sR_a k}{N}} \tilde{X}(sR_a, k)$$

$$= X_r(sR_a, k) + jX_i(sR_a, k)$$

$$= |X(sR_a, k)|e^{j\varphi(sR_a, k)}$$

where $X(sR_a, k)$ is the short-time Fourier transform sampled every $R_a$ samples in time, s is the time index, k the frequency index and h(n) is the analysis window. After spectral modifications, we get $Y(sR_s, k)$, where $R_s$ denotes the synthesis hop size. The output signal y(n) is given by $$y(n) = \sum_{s=-\infty}^{\infty} f(n - sR_s)y_s(n - R_s),$$

where f(n) is the synthesis window, and $y_s(n)$ is obtained from inverse transforms of the short-time spectra $Y(sR_s, k)$ as follows $$y_s(n) = \frac{1}{N}\sum_{k=0}^{N-1}\left[e^{j\frac{2\pi sR_s k}{N}}Y(sR_s, k)\right]e^{j\frac{2\pi nk}{N}}.$$

As shown before, each $y_s(n)$ is weighted by the synthesis window and then added to y(n) by overlap and add. (Crochiere, R. E. and Rabiner, L. R., Multirate Digital Signal Processing, Prentice-Hall, 1983 ISBN: 9780136051626) describe a zero-phase analysis and synthesis for the center of the window by applying a circular shift of the windowed segment before the FFT and after the IFFT. Improvements to the phase vocoder include a phase-locked vocoder (Laroche, J. and Dolson, M., "Improved Phase-Vocoder Time-Scale Modification of Audio", IEEE Transactions on Speech and Audio Processing, vol. 7, no. 3, pp. 323-332, May 1999), which reduces "phasiness" by locking the phase of the spectral bins around significant spectral peaks, and multi-resolution approaches (e.g., U.S. Pat. No. 6,266,003 to Hoek) which enhance the time-frequency tradeoff.

Another frequency domain technique based on STFT (Serra et al., "Spectral Modeling Synthesis: A Sound Analysis/Synthesis System Based On A Deterministic Plus Stochastic Decomposition," Computer Music Journal, Vol. 14, No. 4, Winter 1990, Massachusetts Institute of Technology, 1990), called SMS (spectral modeling synthesis) uses a set of sinusoids to model the stable partials of a sound (the so-called deterministic component), and a residual model to represent what is left, which is supposed to be a stochastic component. The input sound s(t) is decomposed as $$s(t) = \sum_{p=1}^{P} a_p(t)\cos(\varphi_p(t)) + e(t)$$

where $a_p(t)$ and $\phi_p(t)$ are respectively the instantaneous amplitude and phase of the $p^{th}$ partial, and e(t) is the noise component. The residual e(t), assumed to be stochastic, can be described as filtered white noise, $$e(t) = \int_0^t h(t, \tau)u(\tau)\,d\tau,$$

where u(t) is white noise and h(t,τ) is the response of a time varying filter to an impulse at time t. The analysis and synthesis phases are shown in FIG. 7. Improvements to SMS include TMS (Verma, T. S., Levine, S. N., and Meng, T., "Transient Modeling Synthesis: a flexible analysis/synthesis tool for transient signals", Proceedings of the International Computer Music Conference, Greece 1997), which adds a transient model, and a multi-resolution approach (Levine, S. N., Verma, T. S., and Smith, J. O., "Multiresolution Sinusoidal Modeling for Wideband Audio with Modifications," Proceedings of the International Conference on Acoustics, Speech, and Signal Processing, Seattle 1998), which enhances the time-frequency trade-off. SMS enables independent control of each frequency component (harmonic) and flexible timbre modifications.

Additional information about phase vocoders is found in (Laroche, J. "Frequency-Domain Techniques for High-Quality Voice Modification", Proc. of the 6th Int. Conference on Digital Audio Effects. London, UK, September, 2003) and U.S. Pat. No. 6,549,884 to Laroche et al.; and U.S. Pat. No. 6,266,003 to Hoek. Additional information about SMS is found in U.S. Pat. No. 5,536,902 to Serra et al., PCT patent publication WO9013887 to Serra et al., and (Serra et al., "Spectral Modeling Synthesis: A Sound Analysis/Synthesis System Based On A Deterministic Plus Stochastic Decomposition," Computer Music Journal, Vol. 14, No. 4, Winter 1990, Massachusetts Institute of Technology, 1990).

Another approach to audio signal transforming, called FOF (Forme d'onde formantique) (Rodet, X., Y. Potard, and J. B. B. Barrière, "The CHANT Project: From The Synthesis of The Singing Voice To Synthesis In General", Computer Music Journal, 1984: 8(3):15-31), generates a time-domain representation of a single formant as a basic waveform, several of which are added together pitch synchronously to form sequences of voice pulses. In an example, shown in FIG. 8, each FOF (i.e., formant) is described by a set of frequency-domain (center frequency, amplitude, bandwidth, skirt width) and time-domain (phase, excitation and attenuation times) parameters. The formants are combined to form a sequence of voice pulses with onsets at $\tau_{n-1}$, $\tau_n$ an and $\tau_{n+1}$. FOF permits Independent control of each pulse and flexible timbre transformations.

Among the advantages of the techniques described here are one or more of the following. Transformation of each pulse can be independently controlled (as for time domain algorithms), and each frequency component may also be independently controlled (e.g., harmonics in periodic sections, as for frequency domain algorithms), achieving good time and frequency resolution at the same time. The time-frequency constraints of frequency-based techniques where several periods of signal are used to achieve enough frequency resolution for estimating the different harmonic components are reduced as is smearing in the processed signal. As a shape-invariant technique, the phase coherence between the harmonics at pulse onsets are preserved. The computational cost is almost independent of the input signal characteristics (whether it is voiced or unvoiced, whether its pitch is low or high).

Figure 9:
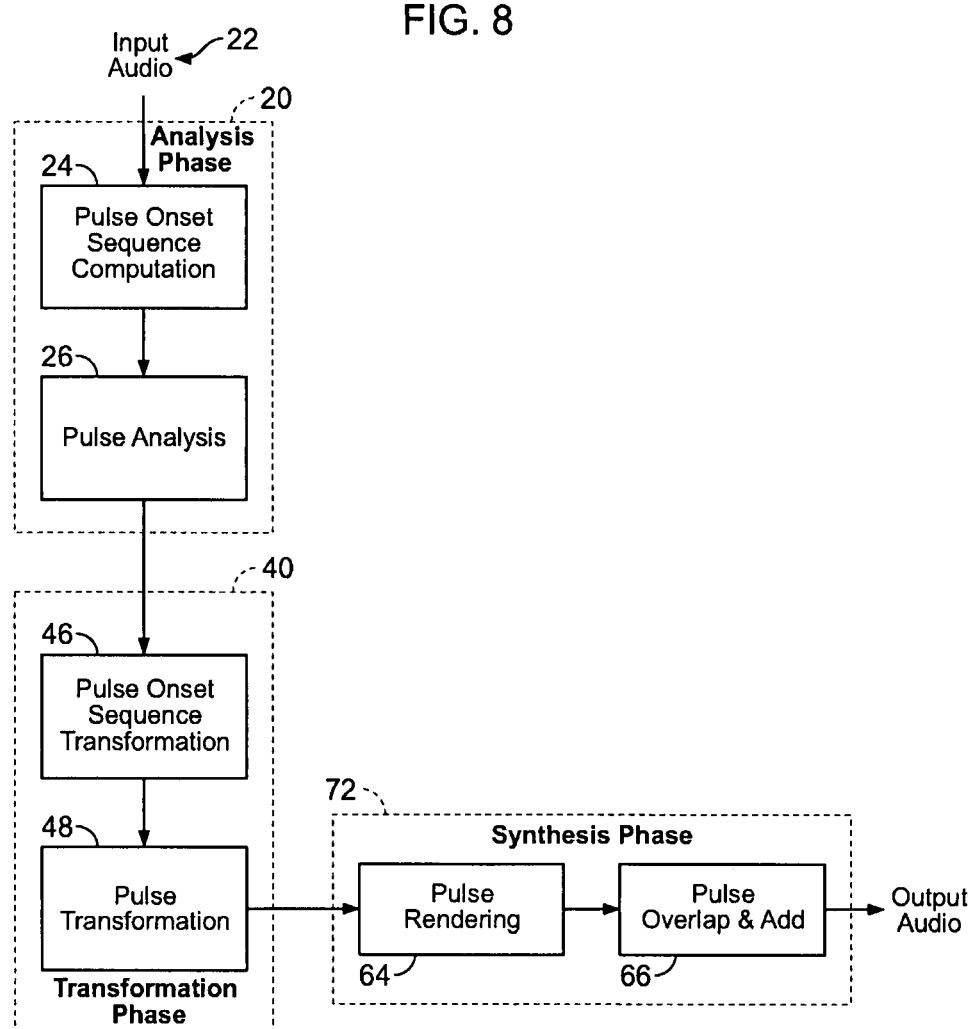

Here we describe audio signal transformations that are implemented using, e.g., analysis, transformation, and synthesis stages (FIG. 9).

In the analysis phase 20, an input audio signal 22 x[n] is analyzed and the onsets of respective voice pulses are estimated 24. Then, each voice pulse is analyzed and its frequency domain characteristics modeled using sinusoids (see also FIG. 10).

The onsets of the voice pulses may be estimated using the results of pitch detection to estimate the phase of the fundamental frequency component that will minimize the phase differences between the lower frequency harmonics. This approach (MFPA algorithm) is described in (Bonada, J. "High Quality Voice Transformations based on Modeling Radiated Voice Pulses in Frequency Domain", Proc. of the 7th Int. Conference on Digital Audio Effects, Naples, Italy, Oct. 5-8, 2004, section 3.1.)

For unvoiced (e.g., un-pitched, non-periodical) segments of the input signal, consecutive pulse onsets are computed by adding an arbitrary period. The pulse onsets $t_r$ are shown in the second waveform of FIG. 10.

Each voice pulse is repeated at the detected pitch rate and the repeated pulses are overlapped using an overlapping function that sums to a constant (for example, triangle, trapezoid, or squared cosine). The overlapping function 26 should apply to a period longer than the actual pulse length in order to smooth the possible discontinuities found at the junctions between adjacent repeated pulses. The resulting audio signal for the r pulse is called $y_r[n]$ and is shown in the third waveform of FIG. 10.

Because the detected pitch rate will almost never correspond to a pitch period of an integer number of samples, samples are interpolated to compute each pulse repetition using, for example, a simple linear interpolation or a windowed sin c interpolation. (see http://ccrma.stanford.edu/~jos/Interpolation/Interpolation.pdf, "MUS420/EE267A Lecture 4, "Interpolated Delay Lines, Ideal Bandlimited Interpolation, and Fractional Delay Filter Design", Julius O. Smith III, Feb. 10, 2007 for a compendium of relevant interpolation methods.)

The resulting audio $y_r[n]$ is then windowed 30 using a certain window function $w_r$, obtaining $z_r[n]$. The windowed waveform is illustrated in the fourth curve shown in FIG. 10. The center of the window should match a pulse onset of $y_r[n]$ to obtain a good estimation of the pulse phase alignment (if the pulse was not centered, the result would be a time-shifted version of the centered pulse spectrum).

A spectrum $|Z_r(e^{j\Omega})|$ (illustrated in the fifth curve in FIG. 10) is derived by applying a Fast Fourier Transform (FFT) 32 to the windowed audio $z_r[n]$. Because the time domain signal $y_r[n]$ is perfectly harmonic (i.e., a fully periodic signal), the computed spectrum will concentrate energy only at the fundamental frequency and its multiples and can be perfectly represented by a vector of pure sinusoidal components.

Figure 10:
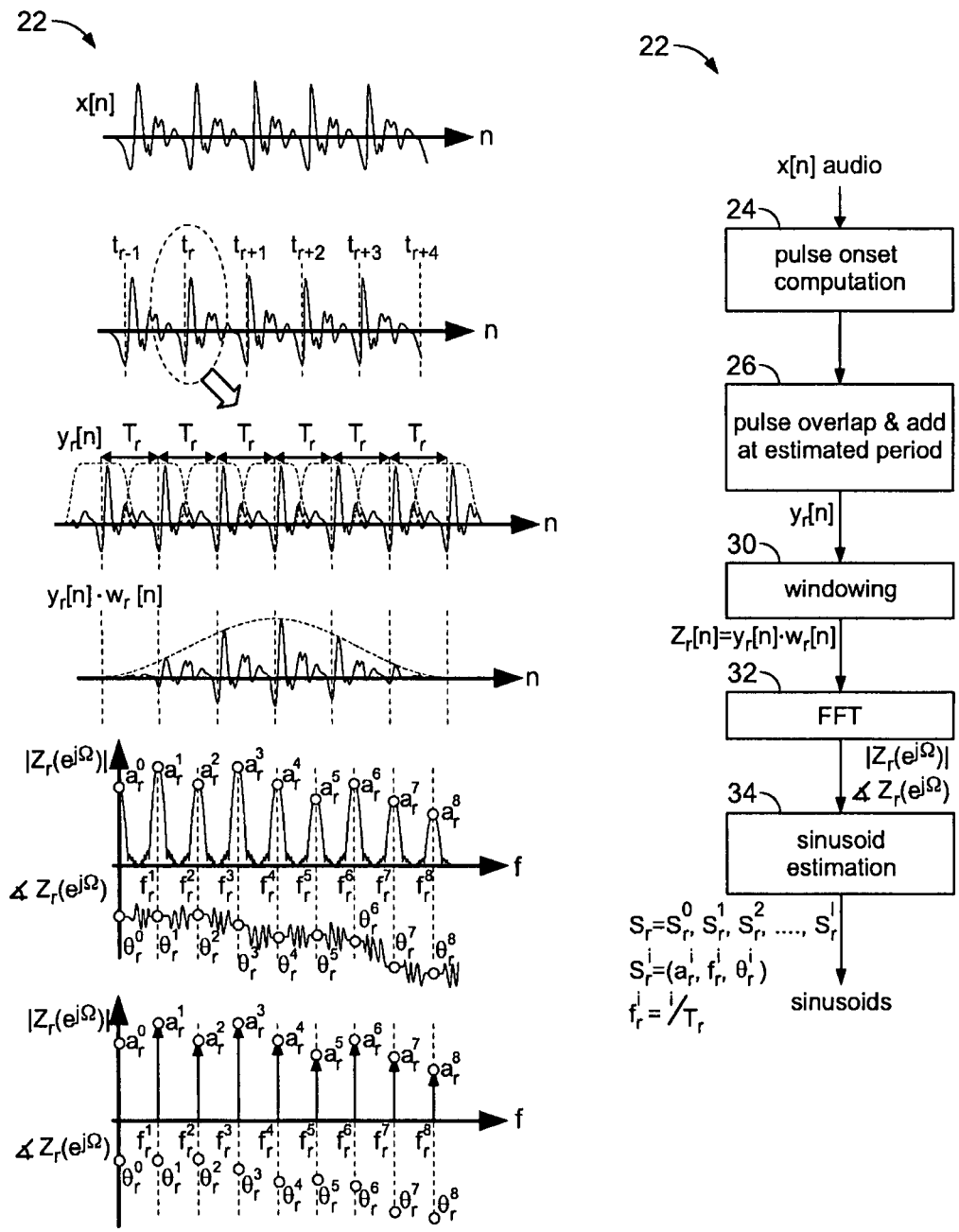

From the spectrum $|Z_r(e^{j\Omega})|$, the amplitude, frequency, and phase parameters of each sinusoidal component are estimated. The frequencies are already known to be multiples of the fundamental frequency. These estimated parameters are illustrated at the bottom of FIG. 10.

Figure 11:
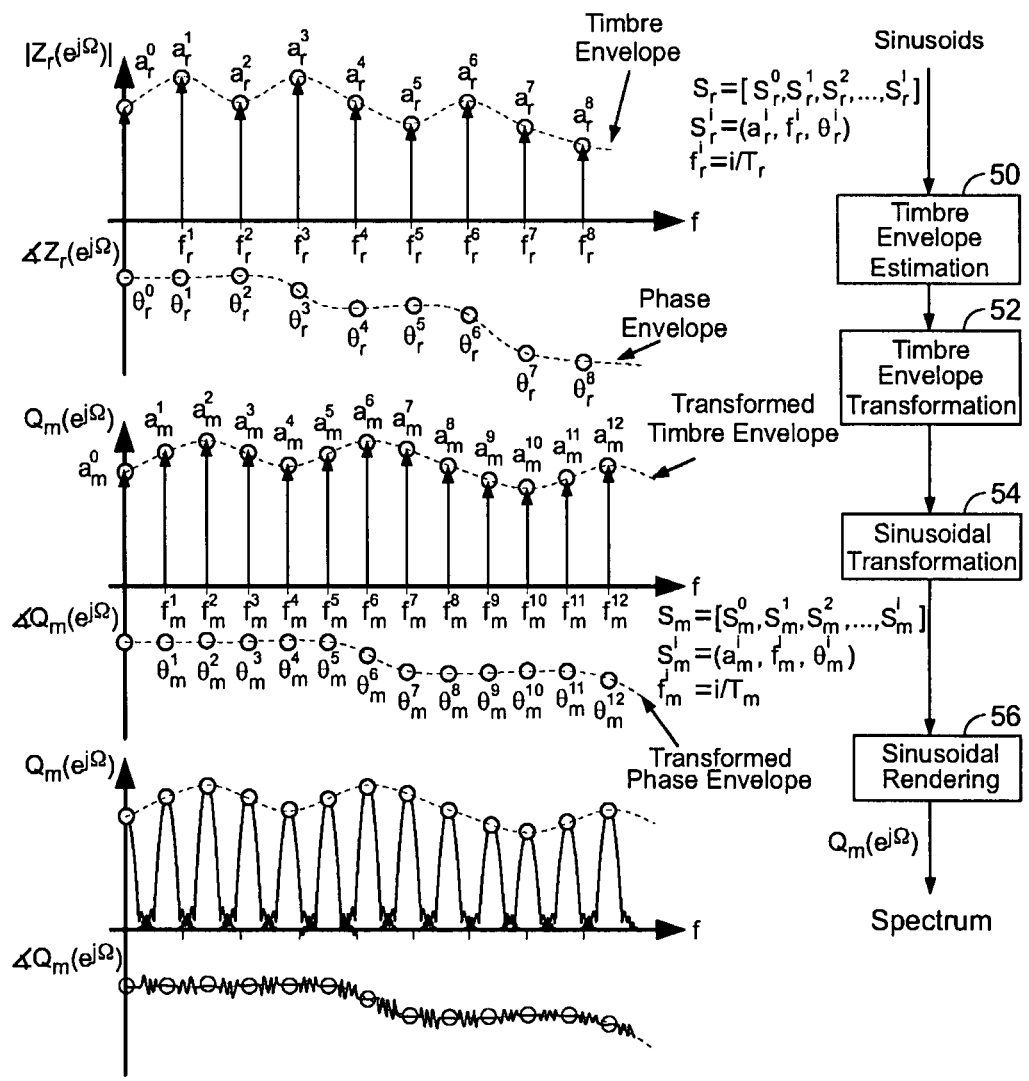
Figure 12:
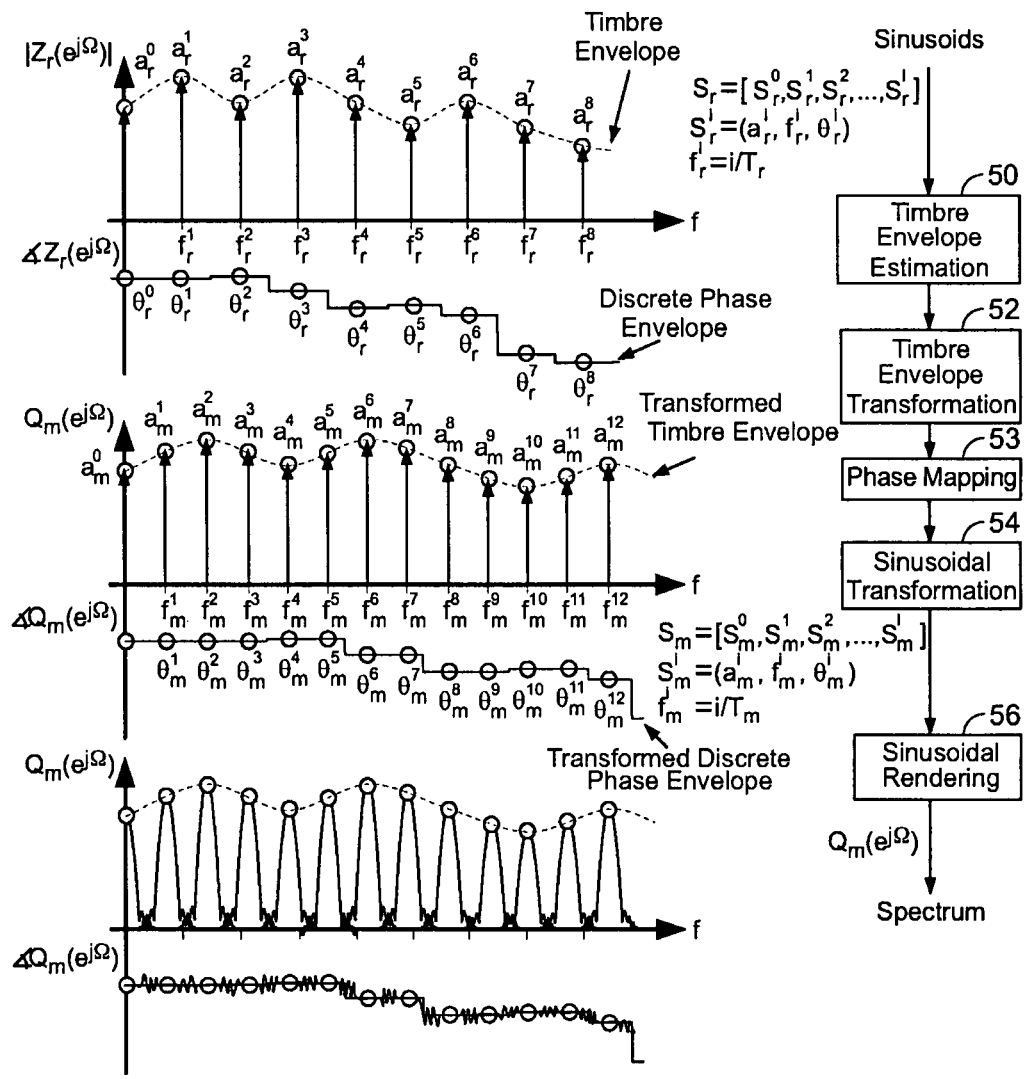

In the transformation stage 40 (FIG. 9), the modeled pulse sequence (resulting from the analysis phase) is modified and a new transformed pulse sequence is created, to be used in the synthesis phase 72. Examples of facets of the transformation are shown in FIGS. 11, 12, and 13.

In FIG. 13, the input pulse onset sequence (shown at the top of each of three different transformation examples) is transformed 46 according to desired transformation parameters (pitch transposition, time-scaling, excitation templates, for example), and a new (output) voice pulse onset sequence is created.

In each example, the output pulse onset sequence is shown below the input pulse onset sequence. The upward arrows point to times from which to compute the pulse data to be synthesized; in some cases, the arrows imply interpolation between input pulses.

The upper example of FIG. 13 illustrates an octave up transformation, the middle example a time-scaling of 1.5 times, and the bottom example a combination of time-varying pitch transposition and time-scaling transformation.

Next, each input pulse (modeled as a vector of sinusoidal components) is transformed 48 according to the transformation parameters (pitch transposition, timbre modifications, and volume, for example). FIGS. 11 and 12 show how the sinusoidal components that represent a given pulse are modified when applying pitch transposition and timbre scaling. In FIGS. 11 and 12, a voiced frame is transposed to a lower pitch and the timbre envelope is expanded.

In the pulse transformation, first the timbre envelope defined by the harmonics (top of FIG. 11) is estimated 50, for example, by interpolating the harmonic amplitudes using linear or spline interpolation, or by estimating the parameters of a filter that approximates the envelope, e.g., LPC.

Next, the timbre envelope is transformed 52 using a mapping function M(f). The transformed timbre envelope at each frequency f is obtained by computing the values of the input timbre envelope at the mapped frequency $f_m$=M(f). The simple case of a linear scaling of the timbre envelope would be defined by a mapping such as M(f)=αf, where α>1 for compression α<1 for expansion.

The third step computes 54 the parameters (amplitude, frequency and phase) of each sinusoidal component (i.e. harmonics) to be synthesized. The frequencies are set to be multiples of the synthesis fundamental frequency. The amplitudes are set by computing the timbre envelope values at the harmonic frequencies. The phases are computed by interpolating the pulse phase alignment (FIG. 11) or choosing the phase of one analyzed harmonic (FIG. 12) using an appropriate phase mapping 53 (e.g., the closest in frequency).

In the synthesis stage 72 (FIG. 14), a synthesis pulse sequence (resulting from the transformation phase) is synthesized, first by computing the frequency domain content of each pulse, then by computing its time domain content (using an IFFT), and finally by overlapping 66 the voice pulses to obtain the resulting audio signal.

The frequency domain content of each pulse is computed by placing a shifted version of the transform of the synthesis window function at the frequency, amplitude, and values of each sinusoidal component. (the last step of FIG. 11). Although any window could be chosen as the synthesis window, the window is preferably symmetrical and has a frequency domain transform for which most energy concentrates in the main lobe. One good choice is the Blackman-Harris 92 dB window, which enables a high quality to be achieved by rendering only the main lobe bins.

Next, an inverse short-time Fourier transform (IFFT) 70 is applied to the synthesis pulse sequence to obtain a time domain signal. Then the previous time domain signal is divided by the synthesis window, whose frequency domain transform was used in rendering each sinusoid.

Figure 14:
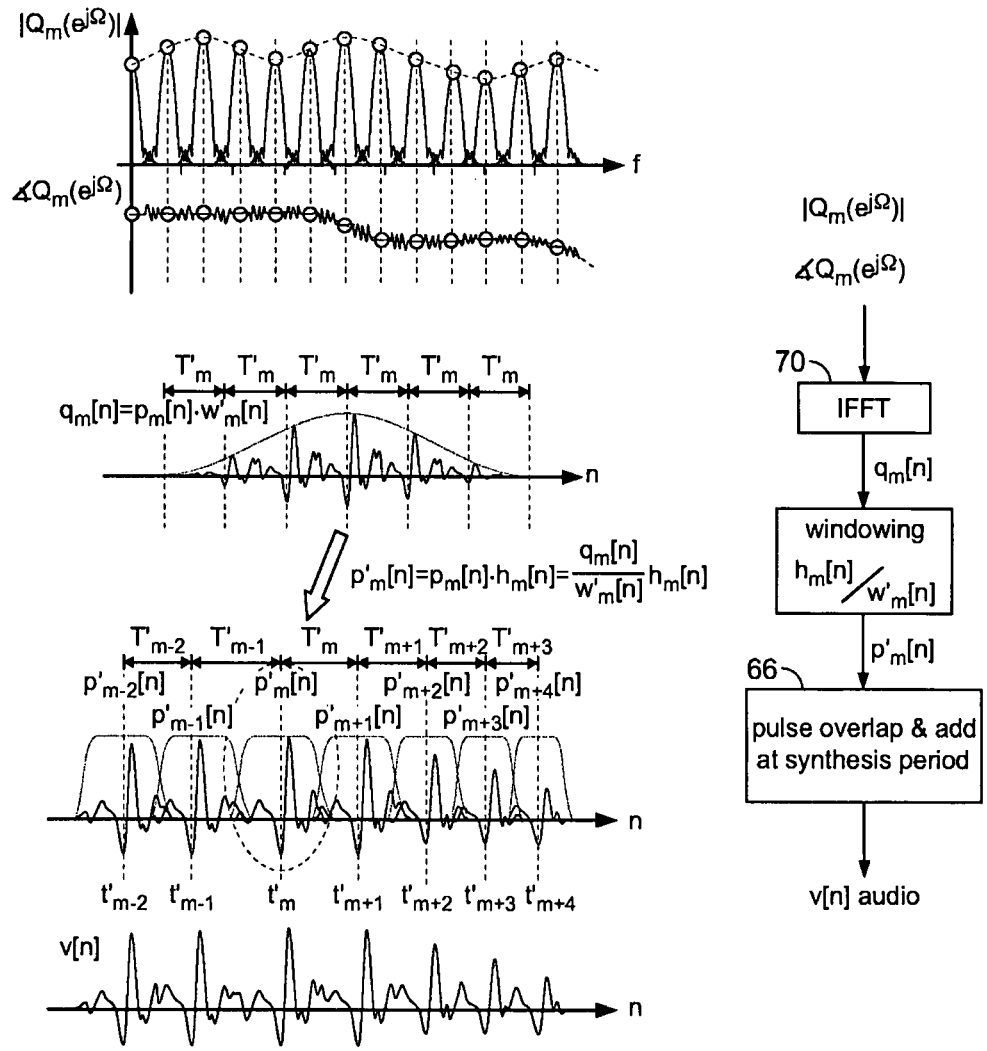

Next, the synthesized pulse signals are overlapped and added 66 using an overlapping function that sums to a constant (such as for example triangle, trapezoid or squared cosine). The overlapping functions will not be symmetric if the fundamental frequency varies, as shown in FIG. 14.

Different overlapping strategies are possible. For example, the length of the overlapping sections may be set as a ratio of the synthesis pitch period length, as exemplified in FIG. 14, and an overlapping window may be used that is constant in the non-overlapping sections. In this case, a segment of samples around each pulse onset will not be overlapped, but will be computed using only the corresponding time domain signal from the IFFT step.

This way to render sinusoidal components in the frequency domain and afterwards overlap and obtain the time domain signal is similar to the one explained in (Rodet et al., "Spectral Envelopes and Inverse FFT Synthesis", Proceedings of the 93rd Audio Engineering Society Convention, San Francisco, USA, 1992), (Depalle and Rodet, Synthèse additive par FTT inverse, Rapport Interne IRCAM, Paris 1990), and in an IRCAM patent (http://www.ircam.fr) (Process for Sound Synthesis, WO93/03478 to Depalle et al., also published as U.S. Pat. No. 5,401,897 to Depalle et al. and French patent 2679689 to Depalle et al.). Another synthesis technique is described in U.S. Pat. No. 6,311,158 to Laroche et al., (Synthesis of time-domain signals using non-overlapping transforms).

The relationship between pitch rate and computational cost for each of the steps in the audio signal transforming is explained below (T is the analysis pitch period length, and T' is the synthesis pitch period length).

If the pulse onset sequence computation (of the analysis phase) uses the pitch detection algorithm and the MPFA method described earlier, its computational cost will not depend on the pitch of the input signal, but rather on the window size applied (set to cover n periods of the lowest allowed fundamental frequency). This results in a cost proportional to $$n/F_0^{min}$$

In the pulse analysis stage, repeating a segment using a time domain waveform interpolation method has a computational cost proportional to the length of the segment T, windowing has a computational cost proportional to the length of the segment T, the FFT has a computational cost in the order of $O(T \cdot \log_2(T))$, and the sinusoidal estimation has a cost proportional to the number of sinusoids, thus proportional to T.

The cost of the pulse onset sequence transformation step of the transformation phase is proportional to the pulse rate, and therefore to the pitch rate (i.e. the more pulses per second in the sequence, the more pulses to compute).

For the timbre envelope estimation, the amplitude of the harmonics is computed using interpolation. The computational cost is proportional to the number of harmonics, thus to the length of the segment T.

The timbre envelope transformation and sinusoidal transformation steps, can be performed together in the same loop. The cost is proportional to the number of harmonics, thus to the length of the segment T.

The computational cost of the sinusoidal rendering step (also referred to as pulse rendering) of the synthesis phase is proportional to the number of sinusoids, thus to the length of the segment T'. The computational cost of the IFFT step is proportional to $O(T' \cdot \log_2(T'))$ The computational cost of windowing is proportional to the length of the synthesis segment T.

The computational cost of the pulse overlap and add at synthesis period step is proportional to the length of the synthesis segment T.

In general, the operations performed on a single pulse (e.g. pulse analysis, pulse transformation, pulse synthesis) are repeated as many times as the number of pulses in the sequence. For a given audio duration, the higher the pitch rate, the more pulse operations must be performed and therefore the higher the computational cost. On the other hand, the higher the pitch rate, the shorter the pulse length, and therefore the lower the computational cost of most pulse operations.

Thus, the computational cost is relatively independent of the input audio characteristics, whether the input audio features a low or a high pitch.

In a software implementation using the C++ language, the computational cost has been shown to be low enough to permit real-time processing on a desktop computer. Because the synthesis module has a lower computational cost than the analysis module (asymmetric computational cost between analysis and synthesis phases), it would be possible to synthesize many voices simultaneously.

Although the techniques have been described in applications that transform audio signals that represent voice, the techniques could also be applied to any monophonic harmonic sound, including most instruments. The input would typically be a stream of digitized samples of the voice or other harmonic sound and the output would be a stream of samples of the transformed voice or sound. The input stream could be stored and read from memory, or appear in real time on a communication channel or from an audio source. The output stream could be stored in memory or delivered to a communication channel or to audio presentation equipment.

Some implementations of the techniques could be software tools in the form of stand-alone applications or plug-ins to other applications. The stand-alone applications could be compatible with multiple operating system (Windows, Linux or Mac, among others) and multiple hardware platforms (PC, Mobile, or PDA, among others) and could be implemented using languages such as Flash that can support all of the operating systems and hardware platforms.

Some implementations could be as hardware tools, for example, digital signal processors (DSPs). Such implementations would likely require optimizations and tunings of the algorithm to suit the hardware device.

Some implementations could be combinations of hardware and software.

Examples of commercial products that could use the audio signal transforming described above could include a dedicated personal computer containing the software together with a microphone and loudspeakers; a plug-in version of the software sold to end-users to be used in their music productions under whatever music sequencer software they use; a software library adapted to a specific DSP platform to be integrated into a piece of hardware (which could be sold as a voice effect rack to be inserted in a typical effects chain of a record studio); and a Flash application specifically designed for a cell phone and sold through a mobile distribution platform to enable that people to transform their voices in telephone conversation contexts.

A wide variety of other implementations would also be possible. For example, implementations would be possible for speech/singing synthesis, broadcast voice processing, voice character transformation (for overdubbing, to create virtual characters, etc.), voice effects for gaming and post-production (in racks, game consoles, PC, etc.), creating harmony sections or doubling voices in music productions, noise cancellation, voice enhancement (such as improving the intelligibility in video-conferences), karaoke entertainment, and IP voice software plug-ins (for use by programs such as SKYPE).

Other implementations are within the scope of the following claims.

For example, although sound quality might be degraded in some cases, the following implementations also may be possible.

Instead of representing and transforming the frequency domain data using a sinusoidal model, other spectral techniques could be used, such as phase-vocoder or SMS-based ones. The quality would probably be similar, but at higher computational cost.

In FIG. 14, synthesized pulses sequences $q_m[n]$ could be overlapped with windows longer than a single pulse provided they sum to a constant.

The pulse onset computation could be simplified to use only the estimated pitch. The segmented pulses then would not align to the glottal pulses and the quality would be degraded.

Alternatives to computing the voice pulse onsets by combining a pitch detection method with MFPA could be used (most without requiring the previous step of estimating the pitch). A compilation and evaluation is found in (Peeters, G. "Modèles et modification du signal sonore adaptés à ses caractéristiques locales", PhD Thesis, spécialité Acoustique Traitement du signal et Informatique Appliqués à la Musique, Universite Paris 6, 2001).

Instead of obtaining the frequency domain data of a repeated pulse, the frequency domain data of several windowed pulses could be computed. That frequency domain representation would be more complex, having energy at harmonics and sub-harmonics, thus requiring more sinusoids for representing it, making the transformations more complex, and increasing the computational cost.

Any window could be used in both the analysis and synthesis stages, although the ones with the best frequency characteristics are preferred.

The phases of the sinusoids of the transformed pulses might be generated using a model instead of modifying the analysis phases. Given the existing relationship between formants and phase alignment at pulse onsets, a possible model would be to scale the derivative of the synthesis timbre. Another possible model would be compute the phases from an LPC analysis of the synthesis timbre. However, it is thought that the best quality would be obtained by modifying the analysis phases as explained earlier.

The invention claimed is:

1. A method of audio signal transforming, the method comprising the steps of:
   receiving a sequence of time domain multiple digital audio samples representing sound;
   computer-implemented processing the time domain multiple digital audio samples to derive a corresponding sequence of multiple audio pulses in the time domain, each said audio pulse being associated with a characteristic frequency of a single pulse corresponding to a pitch associated with the audio pulse, each said audio pulse having a length corresponding to one pitch period of the respective audio pulse;

generating for each pulse a sequence of repetitions of said audio pulse, said audio pulse being repeated according to its own characteristic frequency;

deriving frequency domain information associated with at least some of the sequences of repetitions of said audio pulses, each said sequences of repetitions of said audio pulse being represented as a vector of sinusoids based on the derived frequency, said vector of sinusoids corresponds to a sinusoidal series expansion of the specific audio pulse;

computer-implemented transforming the sound represented by the time domain digital audio samples by processing the audio pulses using the frequency domain information;

overlapping the audio pulses in a pitch-synchronous manner;

transforming each input pulse according to transformation parameters including timbre modifications and estimating a timbre envelope defined by harmonics;

transforming the timbre envelope using a mapping function; and obtaining the transformed timbre envelope at each frequency by computing values of the input timbre envelope at the mapped frequency;

wherein in the speech transformation an overlapping window is used, a computational cost function which depends on a product of the number of pitch periods and the inverse of the minimum fundamental frequency within the window is determined.

2. The method of claim 1, wherein the processing includes determining the characteristic frequency of each of the pulses and determining starting times of each of the audio pulses.

3. The method of claim 1, wherein the transforming is based on specified transformation parameters.

4. The method of claim 1, further comprising a step of presenting audio represented by the processed audio pulses.

5. The method of claim 1, wherein the sound comprises a monophonic harmonic sound.

6. The method of claim 1, wherein receiving the sound comprises reading from a memory.

7. The method of claim 1, wherein receiving the sound comprises receiving the sound in real time.

8. The method of claim 1, further comprising a step of delivering the transformed sound to a memory.

9. The method of claim 1, wherein at least one of the processing, deriving, and transforming is performed by software.

10. The method of claim 1, wherein at least one of the processing, deriving, and transforming is performed by hardware.

11. The method of claim 1, further comprising a step of using the transformed sound for voice synthesis.

12. The method of claim 1, further comprising a step of using the transformed sound for voice broadcasting.

13. The method of claim 1, further comprising a step of using the transformed sound for voice character transformation.

14. The method of claim 1, further comprising a step of using the transformed sound for forming additional parts for music production.

15. The method of claim 1, further comprising a step of using the transformed sound for voice enhancement.

16. The method of claim 1, further comprising a step of using the transformed sound in Internet protocol voice packets.

17. The method of claim 1, further comprising the step of computing the parameters including amplitude and frequency of each sinusoidal component or harmonics to be synthesized;
   said estimation is carried out by interpolating the harmonic amplitudes, and
   each input pulse according to the transformation parameters, including timbre modification.

18. The method of claim 1, wherein said interpolating uses linear or spline interpolation,
   wherein frequencies are set to be multiples of the synthesis fundamental frequency;
   the amplitudes are set by computing the timbre envelope values at the harmonic frequencies; and
   the phases are computed by interpolating the pulse phase alignment or choosing the phase of one analyzed harmonic.

19. The method of claim 1, wherein each generated sequence is processed in the frequency domain to obtain a vector of sinusoidal components for each pulse;
   a vector of sinusoidal components corresponding to each pulse is modified according to predetermined desired transformation parameters; and
   rendering back each transformed synthesis pulse sequence to the time domain; wherein each said audio pulse is repeated at a detected pitch rate and the repeated pulses are overlapped using an overlapping function that sums to a constant.

20. The method of claim 1, further comprising a computer-implemented step of synthesizing wherein a synthesis pulse sequence resulted from the transformation phase is synthesized, the step of synthesizing is initially conducted by computing the frequency domain content of each pulse, then by computing its time domain content, and by overlapping the audio pulses to obtain a resulting audio signal; and
   setting length of overlapping sections as a ratio of a synthesis pitch period length, wherein in speech transformation an overlapping window is used that is exactly constant in non-overlapping sections.

21. A computer program product tangibly embodied in one or more non-transitory machine-readable media for audio signal transforming, the computer program product comprising instructions that are executable by one or more processing devices to:
   receive a sequence of time domain digital audio samples representing sound;
   process the time domain digital audio samples to derive a corresponding sequence of audio pulses in the time domain, each of the audio pulses being associated with a characteristic frequency;
   derive frequency domain information about each of at least some of the audio pulses;
   and transform the sound represented by the time domain digital audio samples by processing the audio pulses using the frequency domain information;
   wherein in the sound transformation an overlapping window is used, a computational cost function which depends on a product of the number of pitch periods and the inverse of the minimum fundamental frequency within the window is determined.

22. The computer program product of claim 21, wherein the instructions comprise a plug-in component for a software application.

23. The computer program product of claim 21, wherein the instructions comprise a software library for a digital signal processor.

24. The computer program product of claim 21, wherein the instructions comprise a downloadable application.

25. A system for audio signal transforming, the system comprising:
- a receiver to receive a sequence of time domain digital audio samples representing sound;
- and a processor to (a) process the time domain digital audio samples to derive a corresponding sequence of audio pulses in the time domain, each of the audio pulses being associated with a characteristic frequency;
- (b) derive frequency domain information about each of at least some of the audio pulses;
- and (c) transform the sound represented by the time domain digital audio samples by processing the audio pulses using the frequency domain information;
- wherein in the sound transformation an overlapping window is used, a computational cost function which depends on a product of the number of pitch periods and the inverse of the minimum fundamental frequency within the window is determined.

* * * * *